Figure 1:
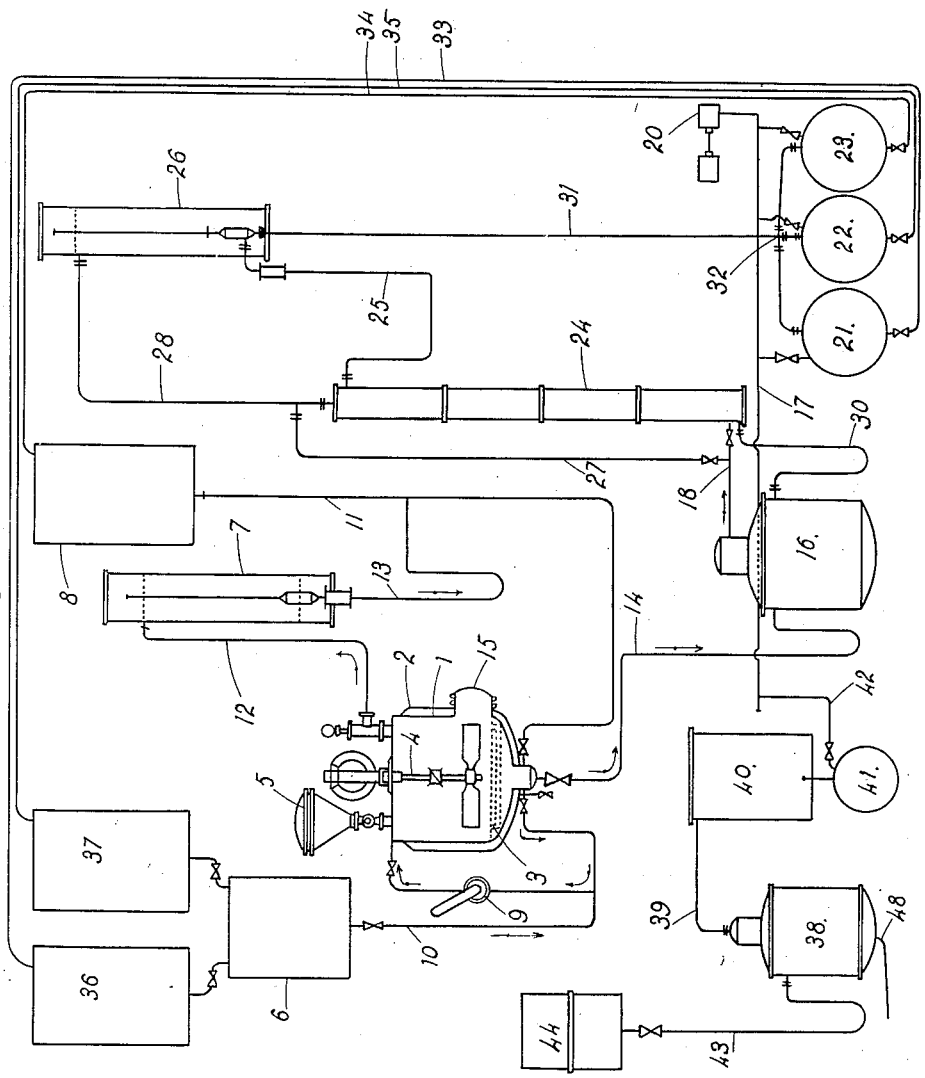
Figure 2:
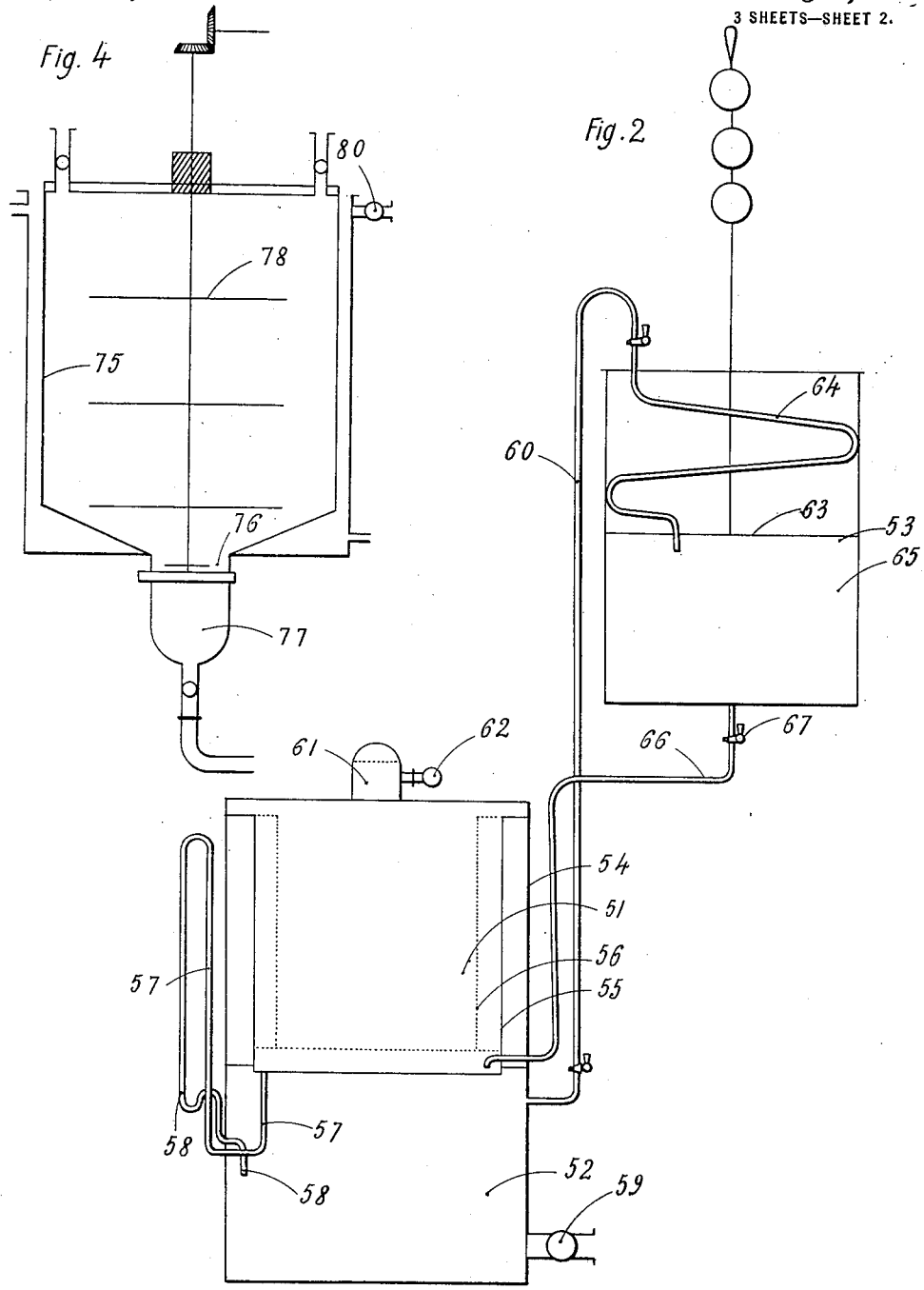
Figure 3:
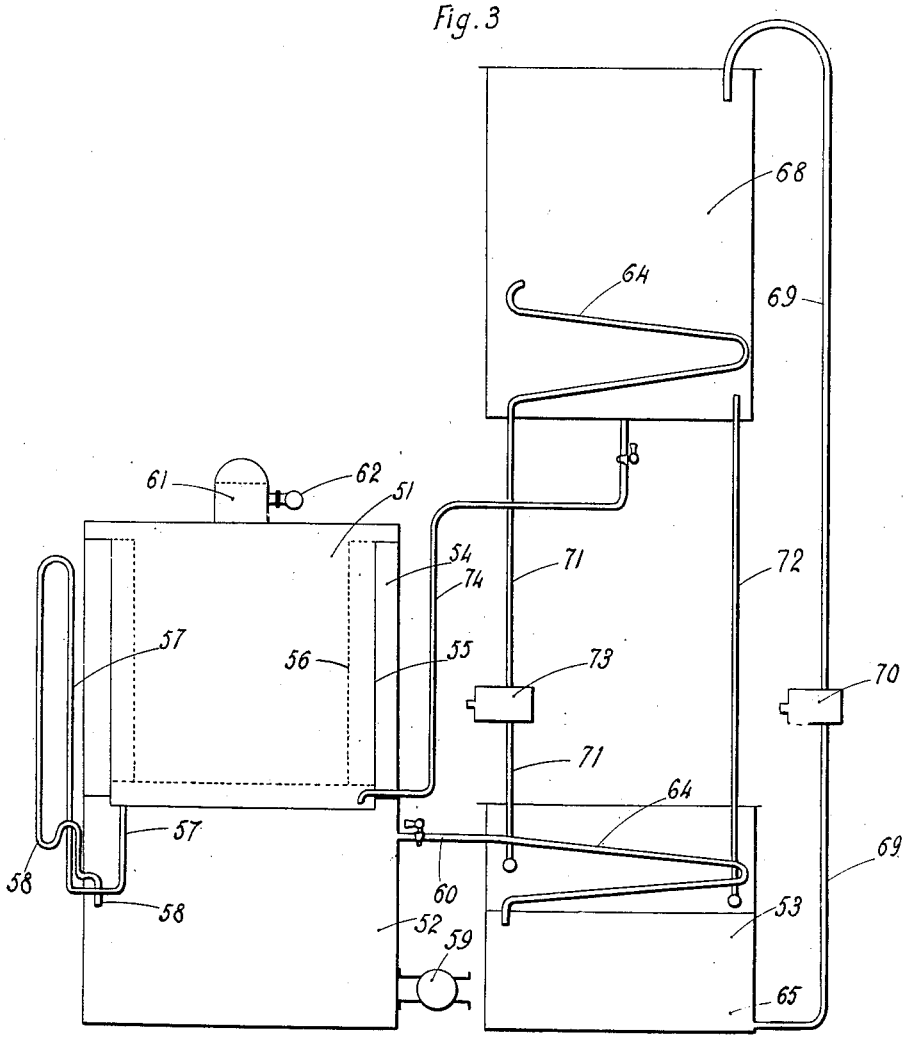

E. DE GROUSSEAU AND A. VICONGNE.
TREATMENT OF COCOA WASTE.
APPLICATION FILED JUNE 8, 1918.

1,386,166.

Patented Aug. 2, 1921.

UNITED STATES PATENT OFFICE.

EDOUARD DE GROUSSEAU AND AUGUSTE VICONGNE, OF CLICHY, FRANCE.

TREATMENT OF COCOA WASTE.

1,386,166.  Specification of Letters Patent.  Patented Aug. 2, 1921.

Application filed June 8, 1918. Serial No. 238,881.

*To all whom it may concern:*

Be it known that we, EDOUARD DE GROUSSEAU and AUGUSTE VICONGNE, engineers, respectively of 12 Place des Fêtes and 30 Rue du Landy, at Clichy, Department of the Seine, France, citizens of the French Republic, have invented certain new and useful Improvements in the Treatment of Cocoa Waste; and we do hereby declare the following to be a full, clear, and exact description of the invention, such as will enable others skilled in the art to which it appertains to make and use the same.

The present invention has for its object a process and apparatus for the treatment of cocoa and principally of the waste products resulting from the manufacture of chocolate in order to simultaneously extract the theobromin, caffein, and fatty matters.

The process consists in the employment, in the presence of ammonia liquor, of a solvent mixture formed of a chlorin derivative of ethane and phenol which mixture possesses the property of dissolving simultaneously the three products which it is proposed to extract from the waste manufacturing products. The said solvent carries away only these products and in no way hinders their easy separation.

One of these solvents is one of the chlorin derivatives of ethane and particularly tetrachlorid of ethane answering to the formula $C_2H_2Cl_4$, the boiling point of which, at normal pressure, is 146° C.

This product dissolves theobromin and fatty matter in large amounts but its solvent power as regards theobromin is considerably increased by the addition of phenol.

For example, one kilo of pure tetrachlorid of ethane, at its boiling temperature of 146 degrees centigrade, dissolves 5 grams and 150 milligrams of theobromin, but the same weight, one kilo, of a solution composed of 825 parts of pure tetrachlorid of ethane and 175 part of phenol dissolves 25 grams and 500 milligrams of theobromin at a temperature of only 20 degrees. These proportions of tetrachlorid and phenol are stated by way of example only. In practice, the proportions used vary from 700 to 900 parts of tetrachlorid of ethane and from 100 to 250 parts of phenol. In order to dissolve the whole of the tetramin contained in the material under treatment, it is essential that the action of the phenolized tetrachlorid of ethane should take place in the presence of an aqueous solution of ammonia.

The average percentage composition of this solution is the following:

Distilled water, 80 parts.
Pure ammonia, at 22° B., 20 parts.

The process comprises three successive phases.

1. Solution of theobromin, caffein and fatty matter in the phenolized tetrachlorid of ethane in the presence of ammonia, by maceration at an average temperature of 60-70° C. Decantation of the solvent, and successive washings of the material to be extracted by pure tetrachlorid of ethane.

2. Separation of the solvent from the solute which comprises the mixture of theobromin, caffein and fatty matter by fractional distillation in vacuum.

3. Separation of the three substances: theobromin, caffein and fatty matters, with the object of obtaining these three bodies separately in a state of purity.

Figure 1 is a diagrammatic view of the plant for carrying out the process.

Fig. 1 of the annexed drawing is a diagrammatic illustration of the plan for carrying out the process and represents an installation by way of example, which comprises a macerating extraction apparatus for the purpose of extracting the cocoa or waste products by the solvent, a vacuum distilling apparatus for the separation and recovery of the tetrachlorid of ethane and an apparatus for the separation and recovery of phenol by entrainment in a current of steam under vacuum, as well as the various secondary arrangements of this type of installation.

The extraction apparatus is essentially composed of a cylindro-conical receiver 1, having a jacket 2 in which a current of steam or hot water is circulated in order to maintain the temperature in the interior of the apparatus between 60 and 70° C.

The conical part of the apparatus forms a double bottom of which the inside bottom is separated from the cylindrical part by a filtering mass 3 composed of wood charcoal, coke, pumice-stone, or other inert porous material, inserted between two perforated metallic plates, the whole forming a filter.

The extractor is provided with a paddle 4 mechanically driven and is connected at one part to a condenser 7 and at another part to a circulating pump 9. The apparatus is surmounted by a cover hermetically sealed by an asbestos joint. This cover carries a charging hopper 5 as well as various measuring apparatus, thermometer, manometer, etc.; and the pipe 12 connecting with the condenser 7.

6 represents the feed tank containing the solvent, communicating with the macerating extractor 1 by means of the pipe 10.

8 represents the tank containing the solution of ammonia communicating by the pipe 11 with the macerator 1.

The method of operation is as follows: The tank 6 being previously charged with the solution of phenolized tetrachlorid of ethane, the latter enters the macerator 1 by the pipe 10 until it reaches a suitable predetermined level.

In a general manner the quantity of phenolized tetrachlorid of ethane should be four times greater in weight than that of the material to be treated.

The material to be treated, previously reduced to powder, is then introduced through the charging hopper 5, the paddle 4 being operated in such a manner as to distribute the mass uniformly in the solvent.

Maceration is allowed to continue for about half an hour with agitation from time to time. The solution of ammonia is then allowed to enter the bottom of the macerator through pipe 11 and this solution, by reason of its lesser density, passes from the bottom to the top through the material contained in the macerator 1.

The current of steam or hot water is then allowed to enter the jacket 2 in order to raise the internal temperature progressively to 60 or 70° C.

Under the influence of the ammonia the cellulose content of the cocoa or waste products expands, thus facilitating the penetration of the solvent.

In addition, the ammonia in combining with tannin of the cocoa waste displaces theobromin and sets it free.

The mass is frequently agitated and after 30 to 45 minutes of maceration the circulating pump 9 is operated and thus the solvent, withdrawn from the bottom of the macerator after having passed through the filtering mass 3, is returned to the top of the apparatus, in this manner establishing a continuous circulation of the solvent throughout the material to be treated. By reason of the temperature of 60/70°, a certain proportion of ammoniacal vapors and water have a tendency to evaporate and are led by the pipe 12 to the condenser 7 from whence they are returned to the macerator by the pipe 13.

At the end of an hour, the solvent being completely saturated is led by the pipe 14 to the distilling apparatus 16.

After the complete discharge of the liquid the macerator is recharged with a sufficient quantity of pure tetrachlorid of ethane for the purpose of washing the material.

The pure tetrachlorid of ethane is brought by the tube 10 from the tank 6 previously charged.

The washing of the substance in the macerator, the paddle having been put into operation, lasts about 30 minutes, the operation taking place as hereinabove described.

The tetracholorid of ethane is then transmitted to the distilling apparatus by the pipe 14, the operation of washing being repeated three or four times according to the richness in theobromin and fatty matters of the material to be treated. It must be clearly understood that these washings are effected while the current of steam or hot water is maintained in the jacket of the macerator so as to obtain a temperature as near 70° C. as possible in the interior of the apparatus.

The material contained in the macerator being then completely spent, it is withdrawn through the door 15 and the macerator is then available for a fresh operation; nevertheless it should be noted that for eliminating the tetrachlorid of ethane, with which the substance treated is impregnated, care is taken before discharging the same to make an injection of steam.

*Distilling apparatus.*—The distilling apparatus is essentially composed of a cylindro-conical receiver 16 surmounted by a domed cover connected to a vacuum pump 20 by the pipe 17 on which are branched the containers 21, 22 and 23.

By means of the pipe 18 the distiller communicates with the rectification column 24, which is connected by the pipe 25 to the condenser 26.

To the pipe 18 is connected another pipe 27 which leads above the rectification column into the pipe 28 leading to the condenser 26.

This fractional vacuum distilling apparatus has for its object to separate the tetrachlorid of ethane from the phenol in order to recover the tetrachlorid of ethane in a pure state.

The working of the apparatus comprises two successive phases; during the first phase distillation takes place in vacuum. Quite at the commencement of the distillation, a small quantity of ammonia and steam begins to distil. This passes through the rectifier 24 and condenser 26, by the pipes 18 and 28, and thence is collected in the container 23 via pipe 31. The three way valve 32 governs pipe 31 and allows the distillation products to be carried at will to container 21, 22, or 23. A mixture of the vapors of tetrachlorid of ethane and of phenol next passes into the rectification column 24 through pipe 18, but, of this mixture, only the tetrachlorid reaches the condenser, the phenol being successively retained on the baffles of the rectification column and returned to the distiller by pipe 30. As soon as the pure tetrachlorid begins to distil, communication with container 23 is interrupted and valve 32 is opened to container 21.

Quite at the commencement of the distillation, a small quantity of ammonia and steam begins to distil. This passes through the rectifier 24 and condenser 26 by the pipes 18 and 28 and then is collected in the container 23 via pipe 31. The 3-way valve 32 governs pipe 31 and allows the distillation products to be conveyed at will, alternately, into the containers 21, 22 and 23. A mixture of the vapors of tetrachlorid of ethane and of phenol next passes into the rectifier column 24 through pipe 18, but of this mixture, only the tetrachlorid reaches the condenser 26, the phenol being successively retained on the baffles of the rectification column and returned to the distiller by pipe 30. When the pure tetrachlorid of ethane begins to distil, communication with condenser 23 is interrupted and valve 32 is opened to condenser 21. At the end of the operation, the phenol is collected with the remainder of the tetrachlorid of ethane in container 22.

When 90% of tetrachlorid of ethane contained in the distiller has thus been eliminated, communication with the rectification column is interrupted while the governing valve of pipe 27 is opened, the phenol then begins to distil with the remaining portions of tetrachlorid of ethane. This mixture flows directly to the condenser 26 and thence through pipe 31 and valve 32, the latter having been turned to conduct these mixed vapors into container 22.

This distillation is carried on until the temperature in the distiller has reached 100/110° maximum, the fractional distillation in vacuum being then considered at an end.

The different products collected in the containers in the process of distillation are distributed as follows: The liquid ammonia is led into the tank 8 by the pipe 34, the pure tetrachlorid of ethane to the tank 36 by the pipe 33, and finally the mixture of phenol and tetrachlorid of ethane to the tank 37 by the tube 35; the delivery to the different tanks being effected with the aid of pumps.

At the end of the distillation a mixture of theobromin, caffein and fatty substances and the residue of the phenol remains in the distiller 16. This mixture is conveyed to the apparatus 38 which is likewise a distiller operating under vacuum but provided with a pipe 48 for injecting steam.

A vacuum having been created in this apparatus with the aid of the pump 20 by means of the system of pipes and containers 17, 42, 41, 40 and 39, steam is injected into the mixture, the phenol is carried away, passes through the pipe 39 and is liquefied in the condenser 40 from whence it flows into the container 41 in the form of an aqueous solution. When the whole of the phenol has been carried away the entry of steam is stopped, the vacuum is maintained for several moments in order to eliminate all traces of water, communication is cut off with the vacuum pump and a solvent of the fatty matter contained in the tank 44 is then caused to enter the apparatus. Preferably petrolic ether or ethlyene dichlorid is employed as a solvent. The fatty matter dissolves while the insoluble theobromin and caffein are precipitated.

The solvent is decanted and conveyed to an ordinary distilling apparatus. The theobromin is washed several times with the solvent so as to eliminate all fatty matter, all the fractions of solvent employed in these washings being conveyed to the distilling apparatus above referred to.

Distillation of the solvent being effected, the fatty matter is recovered.

The mixture of theobromin and caffein is withdrawn from the distiller 38.

This mixture contains small quantities of impurities of which the principal consists of the special tannin of the cocoa. The purification of the mixture and the separation of the caffein from the theobromin are effected at a single operation in the following manner:

The mixture is treated by a dilute solution of soda or of potash, care being taken to avoid an excess of alkali; the theobromin and the tannin dissolve rapidly while the caffein remains insoluble. The solution is filtered, the caffein remaining on the filter being collected and rapidly washed.

The solution containing the theobromin is then submitted to the action of a stream of carbonic acid which precipitates the theobromin.

To collect the theobromin it is sufficient to filter it after an interval, wash it rapidly in cold water, dry it in the air and then in a drying stove. This treatment does not call for the use of special apparatus, any suitable arrangement selected may be adopted.

What I claim is:

1. The process of recovering theobromin from cocoa waste, which comprises agitating the powdered waste in a solvent of tetrachlorid of ethane and phenol in the presence of an ammoniacal solution, separating the solvent from the solute by fractional distillation in vacuum, subjecting the remaining solute to the action of steam and further vacuum distillation, dissolving the fatty matter of the residue of distillation, dissolving theobromin and tannin from the residue n dilute alkali solution, and precipitating theobromin therefrom by the action of carbonic acid.

2. The process of recovering theobromin from cocoa waste, which consists in agitating the previously powdered waste in a solvent of tetrachlorid of ethane with phenol, adding an ammoniacal solution to the solvent, withdrawing the resulting solute from the waste, further agitating the waste in pure tetrachlorid of ethane, separating the solvent from the solute by fractional distillation in vacuum, subjecting the solute to the action of steam and further vacuum distillation, dissolving the fatty matter of the residue of distillation, dissolving theobromin and tannin of the residue in dilute soda solution, and precipitating theobromin therefrom by the action of carbonic acid.

3. The process of recovering theobromin from cocoa waste which consists in agitating the waste in a solvent consisting of 700 to 900 parts of tetrachlorid of ethane, 250 to 100 parts of phenol, and an ammoniacal solution of 75 to 85 parts of distilled water and 25 to 15 parts of ammonia at 22° B., the maceration taking place at a temperature of from 60 to 70° C.

4. The process of recovering theobromin, caffein and fatty matters from cocoa waste, which comprises reduction of the waste to powdered form, maceration in a solvent of phenolized tetrachlorid of ethane, further maceration in the presence of ammonia, fractional distillation of the solvent in vacuum, subjecting the residue of this distillation to the action of steam and to further distillation, dissolving the fatty matter of the residue, with accompanying precipitation of theobromin, caffein and impurities, dissolving theobromin and tannin by dilute alkali solution, and precipitating theobromin therefrom by the action of carbonic acid.

5. The process of treating cocoa waste for the recovery of theobromin, caffein and fatty matters, which comprises agitating and macerating the powdered waste in a solvent of tetrachlorid of ethane and phenol, in the presence of ammonia, at an average temperature of 60 to 70° C., withdrawing the resulting solute, successive washing of the waste with pure tetrachlorid of ethane, separating ammonia and solvent from the solute by fractional distillation, steam washing and further vacuum distillation of the solute, dissolving the fatty matter of the solute, by ethylene dichlorid, withdrawing the dissolved fatty matter from the precipitated residue of the solute, dissolving theobromin and tannin of this precipitate by dilute alkali solution, separating caffein from the precipitate by filtration, and precipitating theobromin from the alkaline solution by the action of carbonic acid.

6. The process of treating cocoa waste and the waste products resulting from the manufacture of chocolate, for the recovery of theobromin, caffein and fatty matters, which comprises macerating the cocoa and waste products in a solvent of phenolized tetrachlorid of ethane at an average temperature of 60 to 70° C., adding ammonia solution to the solvent and further macerating, effecting repeated circulation of the solvent through the waste, withdrawing the solute, washing the waste with pure tetrachlorid of ethane, withdrawing the washings, steam washing and removing the residue of the waste, separating solvent from solute, and separating the several constituents of the solvent by fractional distillation, steam washing and further distilling the solvent constituents of the solute, dissolving the fatty matter of the solute, by the action of ethylene dichlorid, separating the dissolved fatty matter from the precipitated residue of the solute, dissolving theobromin and tannin of the residue by dilute alkali solution, separating caffein from the residue by filtration, and precipitating theobromin from the alkali solution by the action of carbonic acid.

In testimony whereof we affix our signatures in presence of two witnesses.

EDOUARD de GROUSSEAU.
AUGUSTE VICONGNE.

Witnesses:
Francisco Jacomet,
Chas. P. Pressly.